UNITED STATES PATENT OFFICE.

EARL G. WATROUS, OF CHICAGO, ILLINOIS.

FLUSHING APPARATUS.

1,333,646.   Specification of Letters Patent.   Patented Mar. 16, 1920.

Application filed May 12, 1917. Serial No. 168,066.

*To all whom it may concern:*

Be it known that I, EARL G. WATROUS, a citizen of the United States, residing at Chicago, in the county of Cook and State of Illinois, have invented certain new and useful Improvements in Flushing Apparatus for Water-Closets, of which the following is a description, reference being had to the accompanying drawings, forming part of this specification.

My invention has for its principal object an improvement of "ball-cock" valve mechanisms such as are used in the tanks of water closets in connection with a flushing valve which operates to empty the tank quickly and produce a sudden flush of water through the closet bowl, after which, the flushing valve being again seated, the tank is gradually filled by water admitted through the ball-cock valve mechanism. My invention involves the provision of means whereby when the valve is seated by the lifting of the float in the tank to cut off the inflow of water, it will be seated positively and held firmly to its seat to completely cut off such inflow, and subsequent leakage of the water past the valve while in its closed position be prevented; all as hereinafter more fully described and particularly pointed out in my claims.

Figure 1:
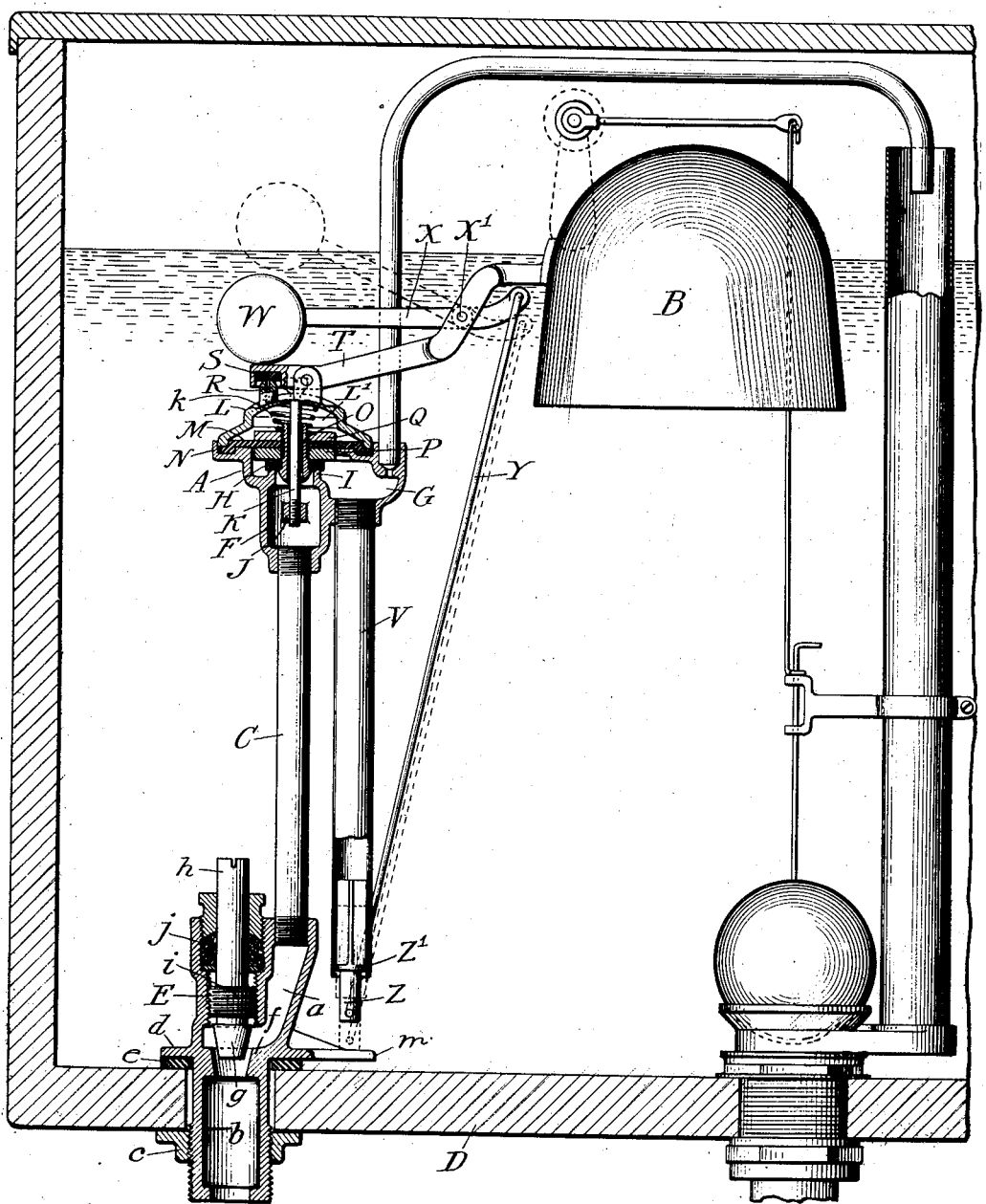
Figure 2:
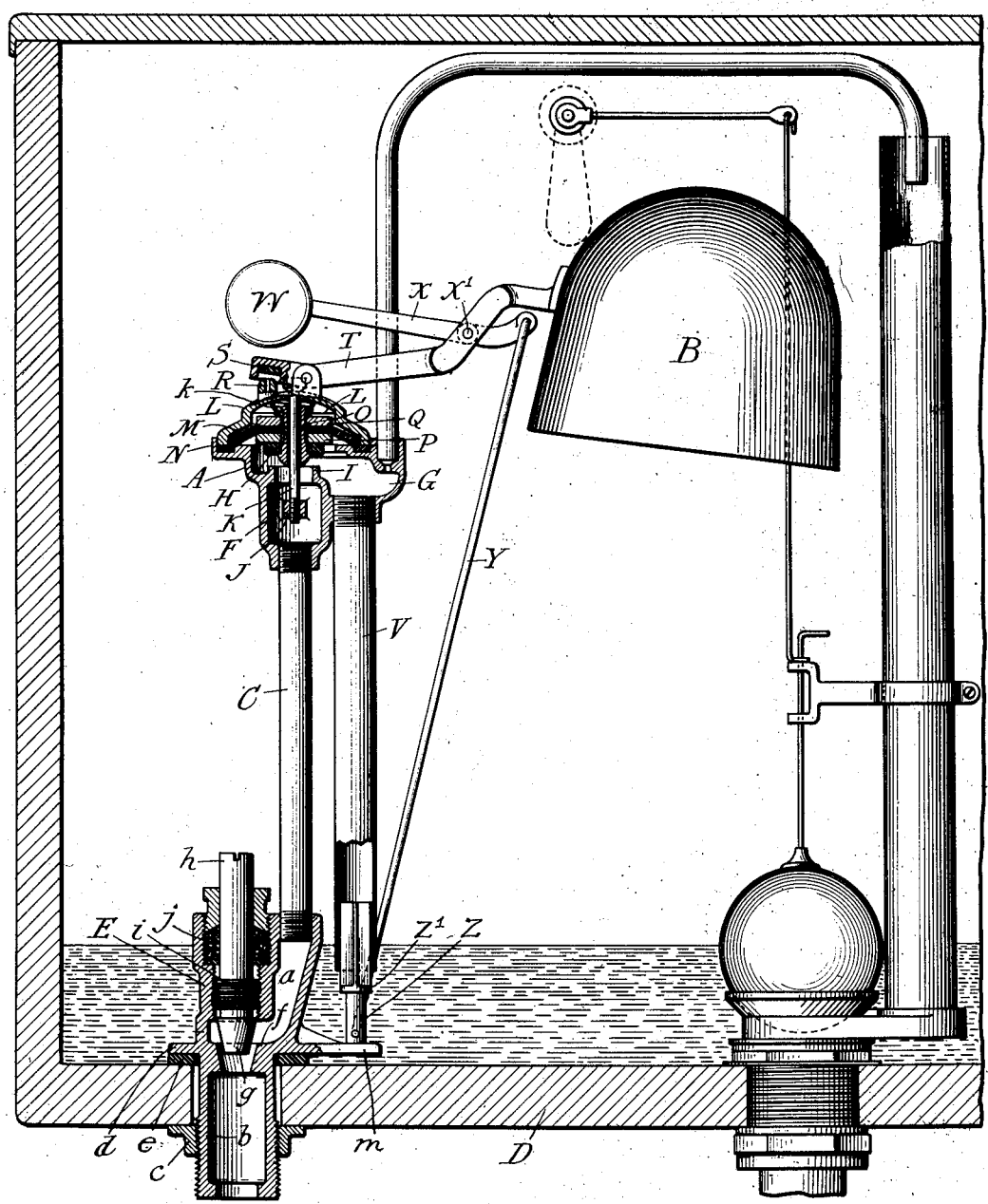

In the accompanying drawings Figure 1 is an elevation of the interior of one end of a flushing tank, disclosing, partly in section, a ball-cock valve-mechanism embodying my invention, and showing the float in lifted position and the valve closed; and Fig. 2 a corresponding view with the float lowered and the valve open.

The same letters of reference are used to indicate corresponding parts in the several views.

A is the valve casing which contains the valve (hereinafter described) which is controlled by the float B, and to the lower end of which water is admitted through a supply pipe C. As a minor feature of my present invention, this supply pipe C, instead of extending directly downward through the bottom D of the tank, as usual, terminates above such bottom wall and is screwed at its lower end into a branch connection $a$ of a valve casing E formed of a casting whose tubular lower end $b$ extends downward through the bottom D of the tank and has a flanged clamping nut $c$ screwed upon its exteriorly threaded lower end. A flange $d$ formed upon the casing E immediately above the bottom of the tank rests upon a rubber gasket $e$ seated upon the upper surface of the bottom D, the nut $c$ serving to firmly secure the parts in place. The valve casing E is provided about midway of its vertical length with a horizontal partition $f$ in which is formed a conical valve seat to receive a conical valve $g$ formed upon the lower end of a valve stem $h$ which is provided with an enlarged externally-threaded portion $i$ engaging through screw threads upon the interior of the tubular upper portion of the casing E, and whose vertically extending portion above the part $i$ passes through a stuffing box $j$ in the interiorly-threaded upper end of the casing E. The valve stem $h$ is provided in its upper end with a nick, by means of which the valve stem may be readily turned, to raise and lower the valve $g$ on its lower end by means of a screwdriver inserted downward from the open upper end of the tank.

The above described construction and arrangement of parts provides a conveniently arranged hand-operated cut-off and regulating valve for the water supply leading to the tank, which is hidden from view within the tank and takes the place of the ordinary valve interposed outside the tank in the supply pipe leading thereto, and consequently exposed to view.

Coming now to the principal feature of my invention, the valve casing A, with which the upper end of the supply pipe C communicates, is provided in the present instance with what may be termed an inlet chamber F, with an outlet discharge chamber G, communication between which is controlled by a valve H adapted to rest upon and coöperate with an annular valve seat I surrounding the open upper end of the inlet chamber F. Screwed at its lower end into a bridge J extending across the inlet chamber F, in the particular construction shown, there is a vertical bolt K extending upward through the cap L constituting the top of the valve casing A and there provided with a nicked head resting upon the top of the cap L. This bolt K serves to hold the cap L in place, and also to serve as a vertical guide for the valve H, which latter is carried by a flexible diaphragm M clamped between the lower edge of the cap L and an annular seat or flange N forming the upper end of the body of the casing A. Surrounding and guided upon the bolt K, is an exteriorly-threaded sleeve O provided on its lower end with an enlargement having an upwardly facing shoulder which bears against the under side of the valve H. This sleeve O extends upward through the valve H and through the diaphragm M, and has screwed upon it, immediately above and below the diaphragm, two disk nuts P and Q, between which the diaphragm M is clamped, and by means of which, also, the valve H is clamped between the enlargement upon the lower end of the sleeve O and the nut P immediately above it.

As will be understood from the foregoing, while the valve H coöperating with the seat I constitutes the valve proper, the valve structure as a whole consists in the present instance of the valve H, sleeve O, nuts P and Q and diaphragm M, all of said parts being guided upon the central bolt K. This particular construction of the valve is not essential, however, to the carrying out of my invention, as will be clear from the explanation of the latter hereinafter given.

The interior of the cap L, or the space between it and the diaphragm M, constitutes a pressure chamber to which water under pressure is admitted from the supply pipe C and inlet chamber F through the space surrounding the guide bolt K within the loosely fitting sleeve O, and from which it may be permitted to escape through a restricted outlet R controlled by a valve S carried upon the end of the float lever T which is fulcrumed near its lefthand end between vertical ears or brackets formed upon and projecting upwardly from the cap L of the valve casing and carries at its righthand end the float B.

The area of the upper side of the diaphragm M which is exposed to pressure of the water in the chamber L' is much greater than the area of the under side of the valve H which is exposed to the pressure of the water within the valve seat I upon which it rests, so that when the outlet R from the chamber L' is closed by the valve S the downward pressure of the water in the chamber L' upon the upper side of the diaphragm M will hold the valve H firmly against the seat I. When, however, the outlet R is opened by the lifting of the valve S, the pressure within the chamber L' will be relieved and the pressure against the under side of the valve H will lift the latter and open the valve and permit the water from the supply pipe C and inlet chamber F to pass to the outlet chamber G, and thence into the tank through the delivery pipe V. If the water pressure of the system is low, a spring $k$ is preferably employed to assist in holding the valve H closed, though with a high pressure system no spring is needed. The movement of the admission valve structure as the valve H opens and closes serves to prevent the lodgment of any matter between the guide bolt K and loosely fitting sleeve O, and thus keeps the by-pass opening into the pressure chamber L clear under all conditions.

The valve S is of course operated by the rising and falling of the float B, being opened by descent of the float when the water within the tank is discharged into the closet bowl, to thereby open the valve H and admit the water supply to the tank to refill the same, and being closed again by the lifting of the float B, as the tank becomes refilled, to thereby close the valve H again and cut off the water supply. If this were the only provision made for controlling the action of the valve H, however, the result would be that when the valve S was closed by the lifting of the float B the valve H would be closed at substantially the same time, and the supply of water to the tank be promptly cut off, so that a balanced condition of things would result, the float B being lifted just high enough to close the valve S and cause the valve H to be seated, and the slightest lowering of the float B serving to open the valve S to a greater or less extent again, and permit an unseating of the valve H by the pressure beneath it, so that the valve H would not be held firmly and permanently to its seat, but would permit a greater or less leakage of water past it. It is well known that such leakage of water past the valves of these ball-cock valve mechanisms, particularly where the water is under considerable pressure, is very damaging to the valves, operating to rapidly wear and cut them away; and it is the object of the further provisions of my invention to prevent such leakage and to cause the valve H to be firmly closed against the seat I by the lifting of the float B, and to be held firmly against such seat until the float B is lowered again by the regular discharge of water from the tank to the closet bowl. To this end I have "loaded" the float B with a weight automatically operated or controlled by the discharge of water into the tank through the ball-cock valve in such manner as to counteract the buoyancy of the float and prevent it from being lifted high enough by the rising water in the tank to close said valve, or cause it to be closed, until the water has risen to a substantially higher level than would have been necessary to close the valve in the absence of such "load" upon it. When it has been finally lifted high enough to close the ball-cock valve, however, and cut off the supply of water to the tank, the load upon it, which is controlled by the inflowing water, is automatically relieved, and the water in the tank, in which the float has been submerged to a greater degree than it would have been in the absence of the load upon it, then operates to strongly press the float upward and to firmly hold the ball-cock valve, or its controlling valve, to its seat, and effectively prevent any leakage of water past the former valve until the float is again lowered by regular discharge from the tank.

My invention, in its broader scope, contemplates the "loading" of the float by any suitable means so controlled or operated by the inflowing water, but in the present instance I have shown such means as consisting of a weight W carried upon the outer end of the long arm of a lever X which is fulcrumed upon and carried by the float-lever X' and having connected to the inner end of its short arm the upper end of a rod or link Y whose lower end is connected to the vertically depending stem Z of a piston or disk Z' loosely fitting, when in elevated position, within the lower end of the delivery pipe V which leads downward from the casing of the ball-cock valve toward the bottom of the tank, the disk or piston Z being provided with four vertically extending guide wings fitting within the lower end of the pipe V, and its downward movement being limited by a stop lug m formed on the valve casing E.

Under this construction and arrangement of parts, when the float B is lowered by a regular discharge of water from the tank, the float lever T, and the weighted lever X and connected parts will assume the position shown in Fig. 2. In this position water discharging from the lower end of the delivery pipe V will impinge against the disk Z' and exert a downward pressure upon it, which will prevent said disk and its connected parts rising with the float as the latter is lifted toward its normal position. The result will be that as the float is lifted toward normal position, against the load imposed upon it by the weighted lever and connected parts, the fulcrumed point of said weighted lever will be lifted higher than the position shown in Fig. 2, and, the right hand end of the lever being prevented from rising by its connection with the disk Z' and the discharge of water against the latter, the lever X will be brought to a still more nearly vertical position than that shown in Fig. 2, as shown by the dotted lines in Fig. 1. When, however, the float B has been lifted high enough, against the resistance of this load upon it, to cause the valve S to again seat against and close the outlet R, the valve H will then be automatically closed and the flow of water into the tank cut off. This will relieve the downward pressure against the disk Z' and permit the weight W on the lever X to restore the parts to the position shown in Fig. 1, thereby relieving the load which had been imposed upon the float B, and, the short end of the lever X contacting the float lever or arm T, the weight, whose center of gravity lies to the left of the fulcrum point of the lever T, will act upon the valve S to keep it closed. Inasmuch as the float B had been lifted to normal position against the load imposed by the weight W, it follows that in order to lift it to such position the water had risen higher in the tank than would have been necessary had the float been free from such load, and this excessive height of water in the tank therefore exerts a strong upward pressure upon the float B and, in conjunction with the direct effect of the weight W, serves to hold the valve S, and consequently the ball-cock valve H, firmly and permanently closed, and prevent any leakage of water past the valve H until the next regular discharge of water from the tank.

While the particular mechanism above described constitutes a desirable and preferred embodiment of my invention it is manifest that it may be varied in the proportions and construction of particular parts, or by the substitution of mechanical equivalents, as for instance the use of a spring exerting tension instead of the weight W acting through the force of gravitation, and I therefore desire my specification and claims to be understood as including all variations and equivalents through which the same functions are attained.

I claim:

1. In a ball-cock valve-mechanism having an admission valve and a float arranged to control the admission of water through said valve, means independent of the admission valve and governed by the flow of water through said valve for counteracting part of the buoyancy of the float.

2. In a ball-cock valve-mechanism having an admission valve and a float arranged to control the admission of water through said valve, a weight connected to said float, and an impact member independent of the admission valve and subject to the impact of water flowing through said valve, said member being operatively connected to said weight and adapted to impose said weight on said float while the member is being acted upon by the flow of water.

3. In a ball-cock valve-mechanism, an admission valve, a float having a pivoted arm operatively arranged to control the admission of water through said valve, an impact member subject to the impact of water flowing through said admission valve, and a lever pivoted intermediate its length to said float arm and at one end equipped with a weight and at the other end connected to said impact member.

4. A ball-cock valve-mechanism according to claim 3 and provided with a delivery pipe arranged to direct the flow of water against said impact member.

5. A ball-cock valve-mechanism according to claim 4 in which said impact member is a piston arranged in the outer end of the delivery pipe.

6. A ball-cock valve-mechanism according to claim 5 in which said piston comprises a loose-fitting disk and more than two upwardly extending guide wings.

7. In a ball-cock valve mechanism, a hollow valve casing having inlet and discharge openings, a valve seat governing the admission of water through said inlet opening, a diaphragm separating the space above the valve seat into a discharge chamber and a pressure chamber, a bypass being provided to permit restricted passage of water between opposite sides of the diaphragm, an admission valve coöperating with said valve seat, a valve seat in the outer wall of said pressure chamber, a pivoted float arm equipped with a float and also equipped with a controlling valve coöperating with said last mentioned valve seat, a weight arranged to normally bear on said controlling valve to close it, and means controlled by the flow of water through the admission valve for lifting said weight.

8. In a ball-cock valve mechanism, a hollow valve casing having inlet and discharge openings, a valve seat governing the admission of water through said inlet opening, a diaphragm separating the space above the valve seat into a discharge chamber and a pressure chamber, a bypass being provided to permit restricted passage of water between opposite sides of the diaphragm, an admission valve coöperating with said valve seat, a valve seat in the outer wall of said pressure chamber, a pivoted float arm equipped with a float and also equipped with a controlling valve coöperating with said last mentioned valve seat, a weighted lever pivoted to said float arm and arranged with the weight normally bearing on said controlling valve to close it, and an impact member operated by the impact of water flowing through said admission valve and operatively connected with said lever to lift the weight while the water is flowing.

9. In a ball-cock valve mechanism, a valve casing having inlet and discharge openings, said casing being formed with a bridge adjacent said inlet opening and the top of said casing being provided with a cap, a valve seat governing the admission of water through said inlet opening, a valve structure comprising a flexible diaphragm separating the space above the valve seat into a discharge chamber and a pressure chamber and an orificed admission valve carried by said diaphragm, a controlling valve for relieving pressure in said pressure chamber, and a bolt arranged centrally of the casing passing through said diaphragm and admission valve and engaging said cap piece and said bridge to serve as a clamping bolt and also as a guide for said valve structure.

10. In flushing apparatus, ball-cock valve mechanism, including a valve casing arranged to be connected with a service pipe and to be secured in the bottom wall of a tank and formed with a valve seat at the inlet opening, said casing having a laterally-extending portion above the valve seat, a valve arranged to coöperate with said seat and having a stem with a threaded portion arranged to engage an interiorly threaded tubular portion of the casing in alinement with the valve seat, the end of said stem being formed for engagement with a tool for rotating it, a supply pipe mounted upon said laterally-extending portion of the casing and communicating with the interior thereof, a second valve casing mounted on said pipe and an admission valve therein, and a float pivotally mounted on said last mentioned valve casing and arranged to control the admission valve.

11. In flushing apparatus, ball-cock valve mechanism according to claim 10 in which the outer portion of the valve stem of the first mentioned valve is of reduced diameter and cylindrical, and in which the first mentioned valve casing is formed with a stuffing box above the interiorly threaded tubular portion of such casing and inclosing said cylindrical portion of the valve stem.

EARL G. WATROUS.